United States Patent [19]

Demke et al.

[11] 4,437,167

[45] Mar. 13, 1984

[54] MULTIPLE HALF-LINE SPACING ON A MINIATURE PAGE

[75] Inventors: Kent R. Demke, Austin; Jerold D. Dwire, Round Rock, both of Tex.

[73] Assignee: International Business Machines Corporation, Armonk, N.Y.

[21] Appl. No.: 221,160

[22] Filed: Dec. 30, 1980

[51] Int. Cl.³ .............................................. G06F 3/14
[52] U.S. Cl. ................................. 364/900; 340/723; 340/744
[58] Field of Search ... 364/200 MS File, 900 MS File; 340/723, 724, 744, 731, 146.3 H, 146.3 MP

[56] References Cited

U.S. PATENT DOCUMENTS

| | | | |
|---|---|---|---|
| 3,654,609 | 4/1972 | Bluethman et al. | 364/200 |
| 4,069,511 | 1/1978 | Lelke | 364/200 |
| 4,138,719 | 2/1979 | Swanstrom et al. | 364/200 |
| 4,153,896 | 5/1979 | White | 340/146.3 H |
| 4,168,489 | 9/1979 | Ervin | 340/731 |
| 4,288,816 | 9/1981 | Kashioka et al. | 340/146.3 MA |
| 4,310,840 | 1/1982 | Williams et al. | 340/723 |
| 4,373,194 | 2/1983 | Demke et al. | 364/900 |
| 4,410,958 | 10/1983 | Demke et al. | 364/900 |

OTHER PUBLICATIONS

IBM Technical Disclosure Bulletin, vol. 19, No. 9, Feb. 1977, p. 3248.
IBM Technical Disclosure Bulletin, vol. 15, No. 7, Dec. 1972, p. 2136.

Primary Examiner—Jerry Smith
Assistant Examiner—Michael R. Fleming
Attorney, Agent, or Firm—Andrea P. Bryant

[57] ABSTRACT

A technique for displaying a representation of a full page on less than an entire CRT screen in a word processing system. The full page representation uses character indicators to enable the word processing system user to appreciate format and spatial relationships with regard to page boundaries. Within the miniature page the interlinear spacing chosen by the operator for the hard copy output is properly represented. Integral line spacing is achieved by displaying blank lines as appropriate. Non-integral line spacing such as half-line spacing is achieved advantageously through manipulating the particular character construct utilized. A character representation matrix is usually blank at the top and blank or non-blank in the bottom half. Reversing top and bottom halves removes one half-line of interlinear spacing.

5 Claims, 8 Drawing Figures

MULTIPLE HALF-LINE SPACING ON A MINIATURE PAGE

DESCRIPTION

CROSS-REFERENCES TO RELATED APPLICATIONS

U.S. patent application Ser. No. 227,109, filed Dec. 30, 1980, entitled "Proportionality In Miniature Displays", and having K. R. Demke as inventor.

U.S. patent application Ser. No. 221,671, filed Dec. 30, 1980, entitled "A Full Page Representation Through Dynamic Mode Switching", and having K. R. Demke and J. D. Dwire as inventors.

FIELD OF THE INVENTION

This invention relates to word processing systems with relatively small CRT display screens. In particular, it relates to the display of a representation of a full page on less than the entire CRT screen so as to make a user aware of page layout. Within this full page representation interline spacings in multiples of half-line spacing may be displayed.

DESCRIPTION OF THE PRIOR ART

It is known in the display art to have superscript and subscript areas of a character box. Generally, the size of a character box is chosen so as to allow extra rows above and below normal symbol placement. In this way sub- and superscripts can be displayed outside the area normally occupied by a symbol.

U. S. Pat. No. 4,168,489 teaches display of a full page representation which is, in fact, a compressed page. That is, character size is reduced. For a given character box size, certain rows are omitted to decreased height. Width compression is achieved with a circuit which causes a decrease in the current flowing through the horizontal winding of the cathode ray tube deflection yoke. No mention is made of specific means for handling interlinear spacing within the compressed page display.

A different approach is illustrated in IBM Technical Disclosure Bulletin article "Combination of Alphanumeric and Formatting Data on the CRT Display", Volume 15, No. 7, December 1972, page 2136. A single dot is used to represent each normally 5×7 dot character. In this technique, the operator can see several lines of text in normal size as well as the total unit of text as represented by dots only. The active window is intensified so that the operator can perceive the format relationship of the active text to the entire text. This active window may be moved at the operator's discretion. Again, no particularized provision is made for handling interlinear spacing.

Still another approach can be found in IBM Technical Disclosure Bulletin "Abbreviated Character Font Display", Volume 19, No. 9, February 1977, page 3248. That author discloses a technique for displaying significant shapes of characters, words, and phrases to allow an operator the ability to quickly access a particular portion of the page without actually reading displayed text.

OBJECTS OF THE INVENTION

It is an object of the present invention to provide a technique for enabling operators of word processing systems to see a representation of an entire page for purposes of fully appreciating text arrangement and spatial relationships to page boundaries.

It is an object of this invention to provide multiple half-line spacings within a miniature representation of a full page on less than an entire CRT screen in a word processing system.

SUMMARY OF THE INVENTION

These and other objects are accomplished in the present invention as a result of a particular structure used to represent characters. When it is desired to display a representation of an entire page, the word processing system main memory is accessed and for each character a single bit is stored in the display buffer. Likewise, each space is represented in the display buffer by a 0. Two bytes, 16 bits, can be used to represent regular characters in the display memory. Therefore, the display buffer contains 16 bits for a regular character. By representing each character or space by a single bit, 16 characters/spaces may be represented in the display buffer in the space normally occupied by the code for a single character. These 16 character indicators represent four characters from each of four lines.

On output, each bit of data from the display buffer is converted from a one bit representation to a 2×4 dot matrix character box. Each 2×4 box represents the presence or absence of a single character. The top two rows are always blank for regular spacing while the bottom two rows are dots if there is a character, and blank if there is no character.

Integral spacing between lines in the miniature page representation is accomplished by inserting a line(s) of blanks between lines of character representations.

Multiple half-line spacing is accomplished in a two step process. First, a blank line(s) is inserted where needed. Second, to achieve half-line spacing, the contents of a row of 2×4 character boxes are reversed so that the top two rows are dots and the bottom two rows are always blank.

BRIEF DESCRIPTION OF THE DRAWINGS

These and other objects and advantages will become clear from a more detailed description with reference to the accompanying drawings wherein:

FIG. 7 is a flow chart showing how processor 6 of FIG. 1 loads refresh memory 18 with miniature page data. FIG. 7 is in three parts, 7A, 7B and 7C.

DESCRIPTION OF THE PREFERRED EMBODIMENT

Figure 1:
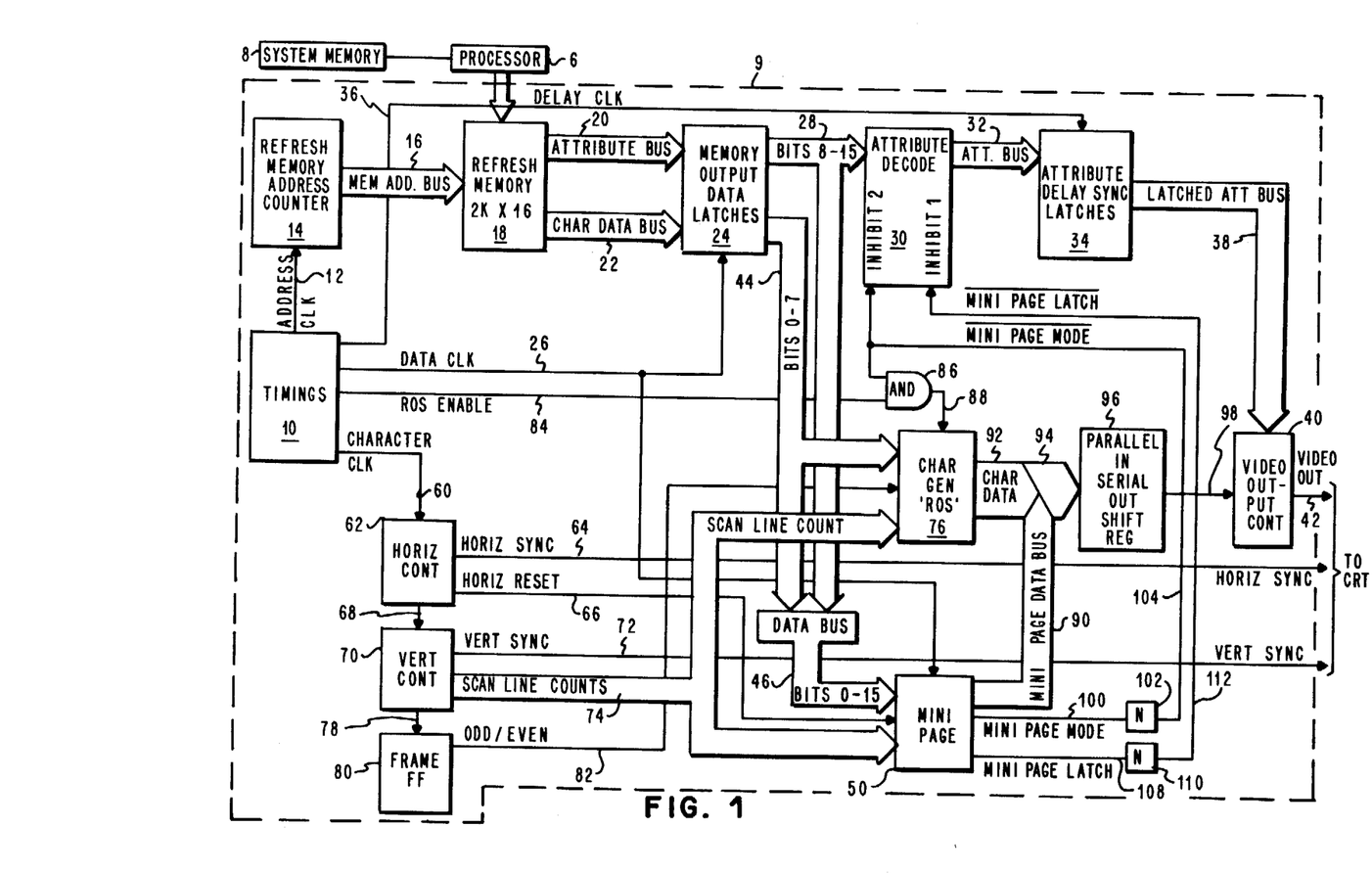
FIG. 1 is a block diagram of a word processing system in which the present invention is embodied.

FIG. 1 is a block diagram of a typical implementation of a word processing system in which our invention is embodied. The illustrated system includes processor 6, main memory 8, a display and a display interface logic 9. Only those connections between processor 6, main memory 8 and display interface logic 9 are shown as needed for purposes of explanation of our invention. Other interconnections therebetween are conventional and well understood by those skilled in the art.

Figure 8:
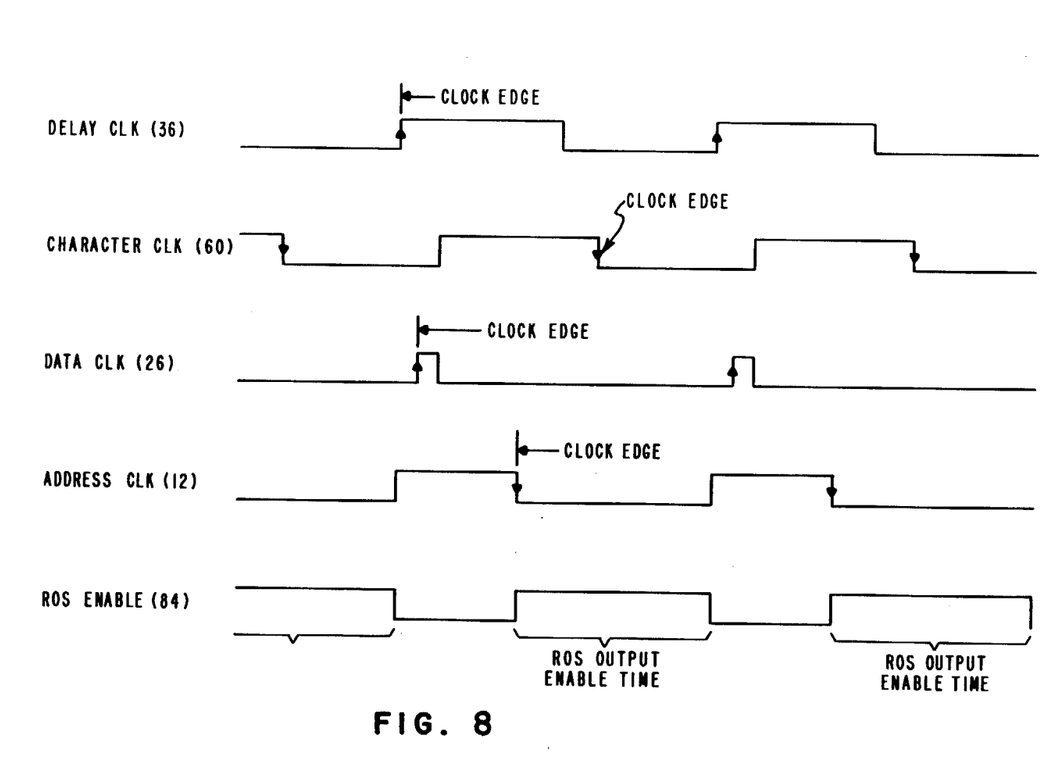
FIG. 8 is a diagram of the relationship among the signals output from timing generator 10 of FIG. 1.

Timing generator block 10 provides various clocking signals for the word processing system illustrated. The wave forms of the signals output by timing generator 10 are illustrated in FIG. 8. The address clock signal on line 12 is input to refresh memory address counter 14 whose output appears on memory address bus 16. The address on bus 16 is input to the refresh memory 18. Attribute bus 20, as well as character data bus 22, are two outputs from refresh memory 18. The data on both buses 20 and 22 are latched into memory output data latches 24. Another clock signal from timing generator block 10 is the data clock on line 26 which is input to data latches 24 for controlling input thereto. Eight bits on bus 28 are output from latches 24 to attribute decoder 30. Once decoded, attribute data is output on bus 32 and is input to attribute delay synchronization latches 34 under control of delay clock signals on line 36. The latched attribute data is output on bus 38 to video output control 40, the output of which on line 42 is the video input to the CRT monitor (not shown).

The other eight bits of character data are output from memory output data latches 24 along bus 44. The total 16 bits of character information from latches 24 on the two buses 28 and 44 are joined in data bus 46 prior to being input to miniature page generator 50. Miniature page generator 50 also receives from timing generator 10 data clocking signals along line 26.

The character clock signal on line 60 is also output from timing generator 10. Character clock signals on line 60 are input to horizontal control 62 which generates horizontal synchronization signals on line 64 which is one input to the CRT monitor (not shown). Also generated in horizontal control 62 are horizontal reset signals on line 66. Horizontal reset signals on line 66 are input to miniature page generator 50 for reasons which will become clear as this description progresses. Vertical clock signals are generated in horizontal control 62 and are passed along line 68 to vertical control 70. Vertical control 70, in a conventional manner, generates vertical synchronization signals along line 72 for input to the CRT monitor. Vertical control 70 also generates counts of lines displayed on bus 74. Line count bus 74 is input to both miniature page generator 50, for purposes which will subsequently become clear, and to character generator storage 76. Vertical control 70 generates frame clock signals on line 78 which are input to frame flip-flop 80. Frame flip-flop 80 generates odd/even signals indicative of frame status in interlaced scanning terms and passes them along line 82 to character generator storage 76.

Character generator storage 76 also has an input from bus 44. Timing generator 10 generates the character generator storage enable signal along line 84 which is gated through AND gate 86. The signal arising in AND gate 86 passes along line 88 to character generator storage 76.

Miniature page generator 50 has three outputs. The first is the miniature page data bus 90 which is DOT-OR'D with the character data bus 92 from character generator 76. Either bus 90 or bus 92 data, as will become clear, is on bus 94 which is input to parallel to serial shift register 96. Serial data is output on line 98 to video output control 40. Another output from miniature page generator 50 is the miniature page mode signal on line 100 which is inverted by inverter 102. The inverted value on line 104 is an input to both attribute decode logic 30 as well as to AND gate 86. The final output of miniature page generator 50 is the miniature page latch signal on line 108 which is inverted by inverter 110. The inverted value of the miniature page latch signal on line 112 is the other input to the attribute decode 30.

Miniature page generator 50 is a key element of the system in which the present invention is implemented. Miniature page data to be displayed on the screen is written into refresh memory 18 using conventional write operations which form no part of the present invention. Once an operator has indicated to a system employing our invention a desire to display a miniature representation of a page, conventional techniques are used to read characters from the main or system memory 8 and to store 1's for characters and 0's for spaces in groups of 16 bits in display refresh memory 18.

Figure 2:
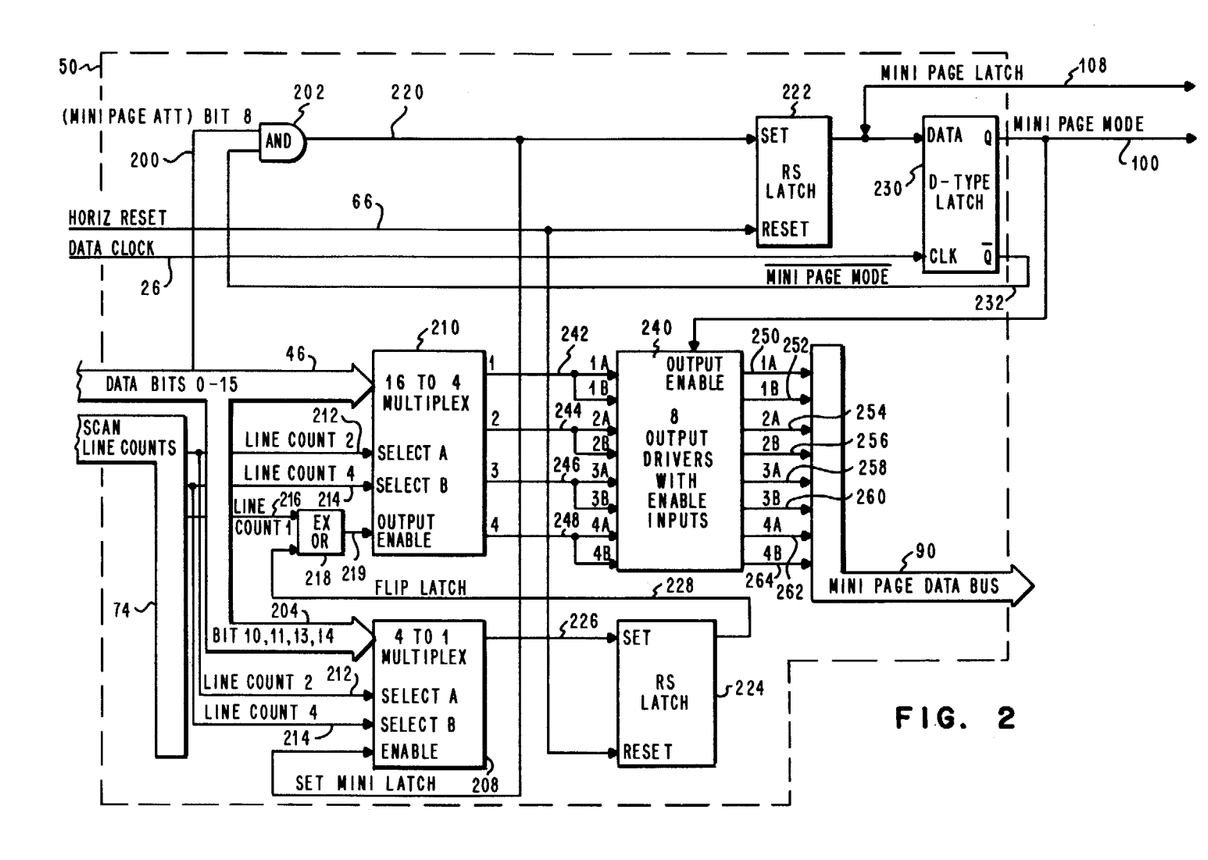
FIG. 2 is a more detailed diagram of the logic of miniature page generator of FIG. 1.

Referring now to FIG. 2 which is a detailed block diagram of miniature page generator 50 a more detailed description will be given. It will be recalled from the description of FIG. 1 that one input to miniature page generator 50 is the 16 bit data bus 46. Throughout this description like reference numerals are used to refer to the same parts. One bit, bit 8, from data bus 46, is used as the miniature page attribute signal and is shown on line 200 as one input to AND gate 202. Four other bits, 10, 11, 13, and 14, from data bus 46 are passed on bus 204 to 4 to 1 multiplexer 208. Multiplexer 208 provides the set signal on line 226 for latch 224 by determining as a function of the state of the signal on lines 212 and 214 which bit from bus 204 and thus which miniature line is to be flipped. This operation will be determined in more detail in connection with FIG. 6. Scan line count bus 74 provides inputs on lines 212 and 214 to 4 to 1 multiplexer 208.

Multiplexer 210 is provided to divide the 16 data bits on bus 46 into four groups of four. Scan line counts 2 and 4 on lines 213 and 215, respectively, are taken from scan line count bus 74. Scan line count 2 provides a Select A input and scan line count 4 the Select B input to multiplexer 210. The particular four bits taken from bus 46 are a function of the states of scan line counts 2 and 4. Scan line count 1 on line 216 is the output enable signal for multiplexer 210.

Each group of four bits is broken down one bit each on lines 242, 244, 246, 248, respectively, on output multiplexer 210. Those lines, 242, 244, 246, and 248, are fanned out so that each one provides two inputs to a block of eight output drivers 240. When the miniature page mode indicator on line 100 is up, it enables output from the eight output drivers comprising block 240. The two bits derived from the one bit on line 242 are output on lines 250 and 252. Similarly, the two bits from line 244 are output on 254 and 256, the two from line 246 on lines 258, 260, the two from line 248 on lines 262 and 264. These eight bits make one parallel word or byte of data on miniature page data bus 90 which provides an input to parallel to serial converter 96.

The serial output from shift register 96 is provided to video output control in the conventional manner for display on the CRT. Thus, the single bit stored in refresh memory 18 as a result of examining the data in the system main memory is changed to double dots in a 2×4 character box for output in the miniature page mode.

These same scan line count value signals, Line Count 2 and Line Count 4, are also applied to the Select inputs of 16 to 4 multiplexer 210. Line Count 1 is passed along line 216 to exclusive OR gate 218, the output of which on line 220 is the Output Enable signal for 16 to 4 multiplexer 210.

The output of AND gate 202 is the set miniature page latch signal on line 220. This signal is applied to the set input of RS latch 222. The signal on line 220 is also the enable input for 4 to 1 multiplexer 208. The reset signal for RS latch 222 is the horizontal reset signal on line 66. RS latch 222 develops miniature page latch signal 108.

The set input to RS latch 224 is along line 226, the output of 4 to 1 multiplexer 208. Horizontal reset signal on line 66 is also used to reset RS latch 224. The output of RS latch 224 appears on line 228 and is the flip latch signal and is the other input to exclusive OR 218.

Miniature page latch signal on line 108 is the data input to D-Type latch 230. The clock input to latch 230 is the data clock signal on line 26 from timing signal generator 10 in FIG. 1. Latch 230 develops two outputs. The Q output is the miniature page mode signal on line 100, the Q̄ output, the inverted miniature page mode signal on line 232 which is the other input to AND gate 202. The Q output of latch 230, the miniature page mode signal on line 100, is also applied to the Output Enable of output drivers 240.

Figure 3:
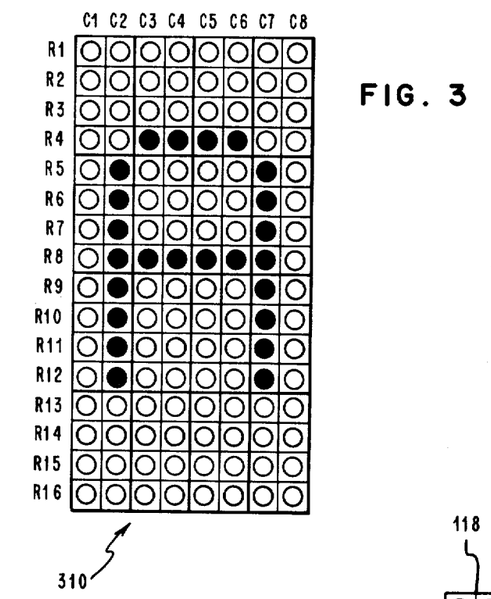
FIG. 3 is an 8×16 character box.

FIG. 3 is a schematic illustration of a normal size character box 310 as contemplated in the present invention. In our exemplary embodiment, this character box is 8×16, 8 columns wide and 16 rows high. Rows are denoted R1 through R16; and columns, C1 through C8. A conventional CRT using interlaced scanning, as is well known in the art, can display dot matrix characters 8 dots by 16 dots high. Not all of these individual matrix positions are usually used for a given character. A regular character may, for example, be contained in rows 4 through 12 with the unused space being reserved for sub- and superscripts, and/or interline spacing. Columns 2 through 7 may be used for dots, and unused columns for inter-character spacing.

Figure 4:
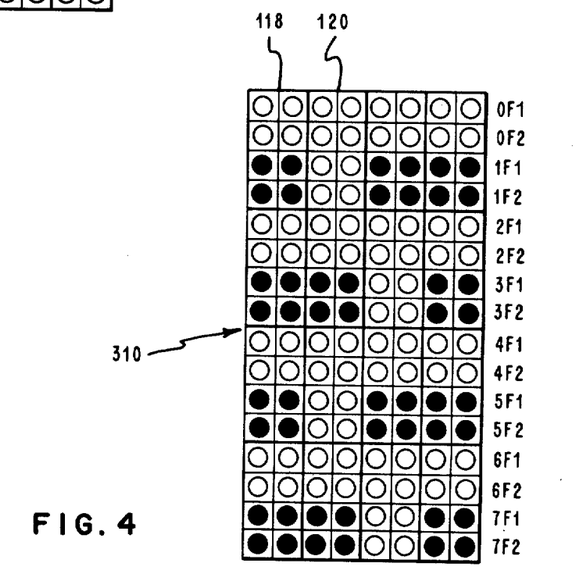
FIG. 4 shows miniature character indicator boxes in relation to an 8×16 character box.

FIG. 4 shows how that same 8×16 matrix 310 can be divided into 16 2×4 miniature character representation boxes. In this manner we are able to display four characters for each of four lines, which may be consecutive, in the space normally occupied on a CRT screen by a single, normal size character. It is to be especially noted that our miniature display is not a display of characters, but of character representations which enable an operator to comprehend format and spatial relationships on the page being processed.

It is our character representation structure which permits miniature page display with minimal hardware impact. The use of interlaced scanning is advantageously combined with that structure. In interlaced scanning half of the alternating horizontal lines are scanned. These may be referred to as Field 1. The other half of the horizontal lines, alternating with Field 1 lines, are then scanned. These lines are referred to as Field 2. Scan Fields 1 and 2 are interlaced. In FIG. 4, the 16 rows are designated as ØF1, 1F1, 2F1 . . . 7F1 or ØF2, 1F2, 2F2 . . . 7F2, where F1 and F2 indicate scan Fields 1 and 2, respectively.

We use the convention that 0 is an even number. It can be seen then that the even rows of both Fields 1 and 2 are blank, i.e., not dotted. In each of the 16 separate character representation boxes, these even rows are the topmost two rows. The bottom two rows in each box represent characters or spaces. Boxes like 118 are characters. Those like 120 are spaces.

Figure 5:
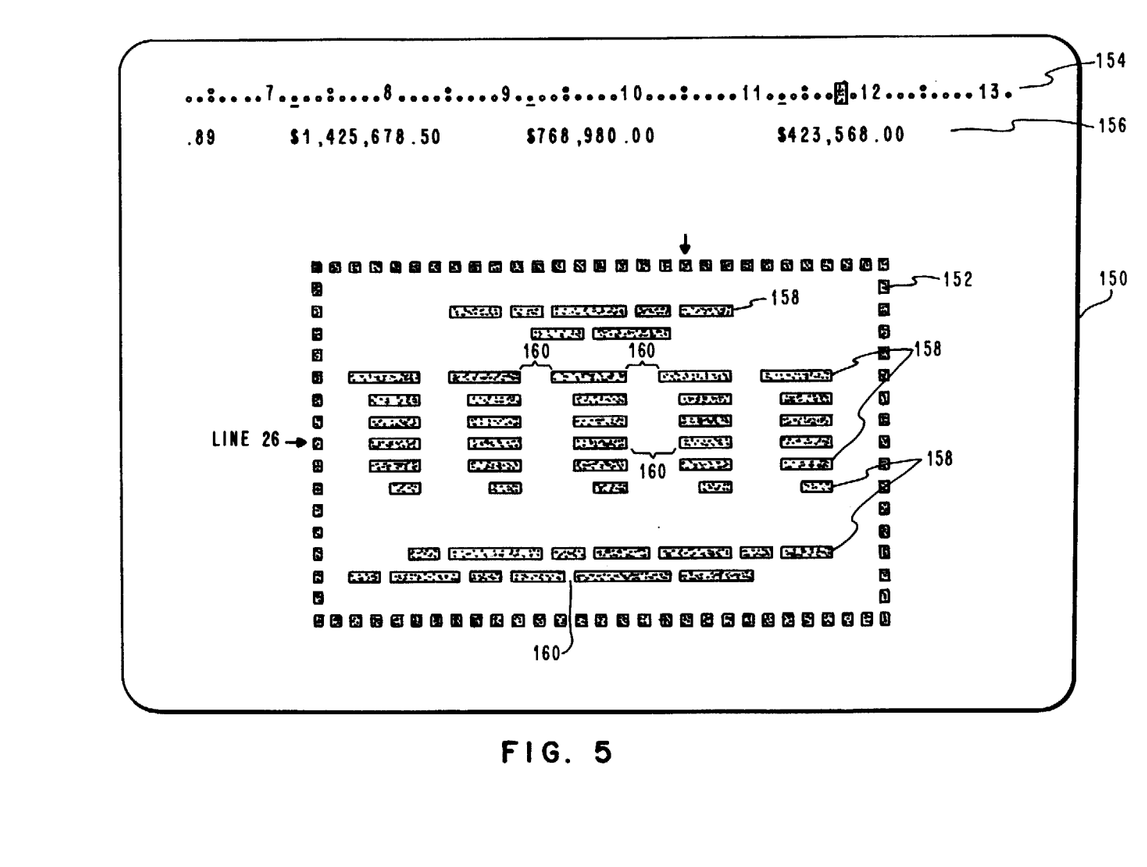
FIG. 5 is a schematic view of a display screen frame including a miniature page representation.

FIG. 5 shows CRT screen 150. Indicated generally at 152 is a miniature full page representation for showing format and layout of the page being processed. Indicated generally at 154 is the scale line, and at 156 the active cursor line, that is, the text being entered or modified. Within miniature page representation 152 thick line segments 158 comprise a plurality of adjacent character representations 118 as shown in FIG. 4. Spaces 160 consist of space representations 120 in FIG. 4.

In a conventional manner cursor position within page representation 152 may be identified by blinking the particular miniature character representation corresponding thereto.

The miniature page indicated in FIG. 5 does not represent any multiple half-line spacing. It is shown for illustrative purposes only. However, referring now to FIG. 6, an appreciation for multiple half-line spacing may be gained. Indicated generally at 170 is a partial attribute byte. It will be recalled that normal size characters, that is characters displayed in an 8×16 character box, are represented in the refresh memory of FIG. 1 using two bytes. One is for attributes related to features such as underscore, reverse video, etc. Actual character data is stored in the other byte. When it is desired to begin displaying a miniature page representation, the operator so indicates; and the software causes a particular attribute bit, bit 8, to be set on. The other byte containing character data would usually be loaded with a space. Each following two byte word opening, therefore, in a given line contains no further attribute data. The entire 16 bits of the two byte character location is utilized to represent 16 character/spaces.

Figure 6:
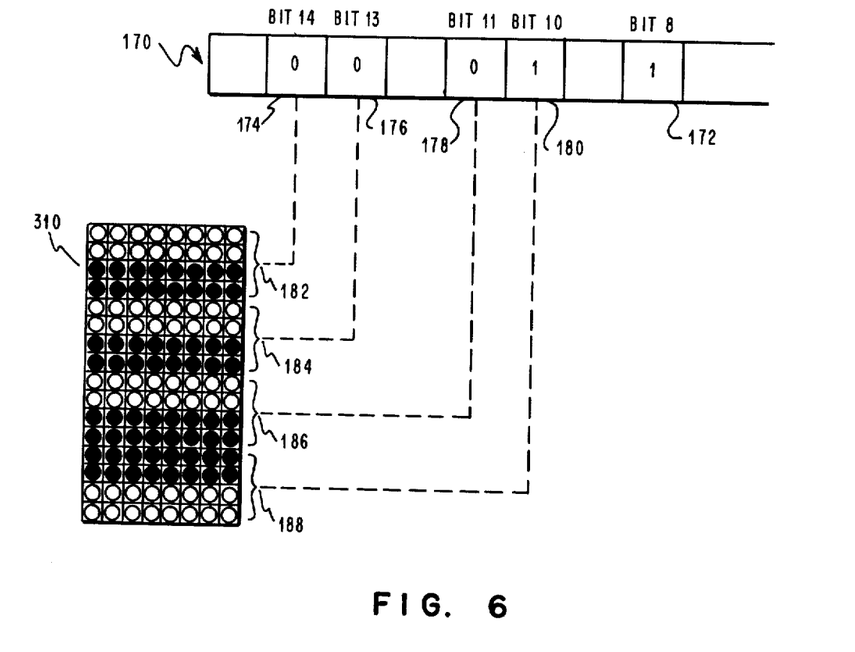
FIG. 6 illustrates the relation between attribute bits and line spacing within a character box.

Refer to FIG. 2 preparatory to a discussion of FIG. 6. Bus 46 carries bits 0–15 to miniature page generator 50. Bit 8, the miniature page attribute bit, is placed on line 200. Bus 204 carries bits 10, 11, 13, and 14, which are associated, respectively, with each of the four miniature lines of a given normal size character line. These bits are used to indicate whether these miniature lines are to be flipped.

Turning now to FIG. 6, a portion of 170 of bus 46 (FIGS. 1 and 2) is represented. Bit 8 is indicated at 172 and is on to indicate that miniature page data displayed for the rest of that line. Also shown is 8×16 character box 310 divided into four rows 182, 184, 186, and 188, of four miniature character representations.

The four character rows, which are consecutive rows as described with reference to FIG. 4, each have associated therewith a bit, 14, 13, 11 and 10, respectively, which indicates whether that entire line, not just the four characters shown in FIG. 6, is to be flipped. These four bits are stored in the same byte as the miniature page attribute bit.

Recall in FIG. 2 that line counts 2 and 4 on lines 212 and 214 are the select inputs to multiplexer 208 for determining which of four miniature lines associated with a given full size line is to be flipped. This selection is made in accordance with the following table.

TABLE I

| Mini Line | Line Count 2 | Line Count 4 |
|---|---|---|
| 182 | OFF | OFF |
| 184 | ON | OFF |
| 186 | OFF | ON |
| 188 | ON | ON |

Thus, on output, since bit 10 is set to 1, the miniature character boxes in row 188 are reversed to place solid dots at the top. This results in half line spacing. Similarly, rows 182, 184, and 186 are associated with bits 174, 176, 178, respectively. These attribute bits are off resulting in the associated rows being sent to the screen with single spacing.

It will be understood by those skilled in the art that it is possible on output to insert blank rows between any of rows 182, 184, 186, and 188 as desired. This will become more obvious as the description progresses.

When the miniature page mode is desired to be entered, a particular bit is set in the attribute byte of the last character space before the miniature page is to be displayed. The system is structured such that when a miniature page mode is entered on a given line, the rest of the line is in miniature page format. Up to that point on the line, full size text may be displayed; however, it will be recalled that in this particular system a full size character is placed in an 8×16 character box and that the character construct used in the miniature page mode is a 2×4 character box. Sixteen miniature page character representation constructs fit in the space normally occupied by a full size character so that in one full size character box four characters from four lines which will be sequential lines are displayed.

When the data is examined in the system or main memory 8 of FIG. 1 and one bit stored in the display or refresh memory 18 for each character or space, a given storage location of 16 bits is arranged so that there are four groups of four bits representing four characters or spaces from four different lines.

Referring again to FIG. 1, the overall block diagram of the display word processing system including our invention, normal data flow, when only full size text is to be displayed, is from the main memory 8 to the refresh memory 18. The attribute byte on bus 20 which normally governs such things as cursor, blinking, reverse video, attribute goes to the video control 40; and the data byte on bus 22 is used to access the character generator storage 76 so that the correct code is sent over buses 92 and 94 to parallel to serial converter 96 and thence to video control 40. When in the miniature page mode, however, there is but one attribute for the remainder of the line and once that has been detected the hardware is switched so that the path of the attribute data to the video control 40 is blocked and the path of the data bus through the character generator storage 76 is blocked.

Rather, both attribute and data buses 20 and 22 are placed along one bus 46 which goes through the miniature page generator 50 and thence to the parallel to serial converter 96 via buses 90 and 94 and thence to the video control 40. It will be recalled from the discussion of FIG. 2, a more detailed diagram of the miniature page generator, that the one bit stored in the refresh memory 18 for each character or space is doubled for input to output driver block 240 and thence output to the parallel data bus 90 which is serialized and sent to the video control for display on the screen.

In a word processing system embodying our invention it is possible for an operator to choose single 1½, double, 2½, triple, etc., line spacing for printed output. The primary purpose of displaying the miniature page is to give the operator the best possible understanding of how the final output will appear. It is, of course, important that spaces between lines be accurately displayed within the miniature page representation. Integral line spacings are implemented, as can be well understood by those skilled in the art, by using conventional software techniques to load blank lines between the lines of text in the display refresh buffer 18 shown in FIG. 1. For example, double spacing requires that one blank line be loaded between each two lines of text. This is a software function and in no way impacts the hardware.

Half-line spacing, however, requires some modification to standard hardware as previously described with reference to FIG. 2. A character representation is reversed in its 2×4 character box to achieve the half-line space. Within our unique 2×4 character representation box, the top 2×2 part is reversed with the bottom 2×2 part.

The operation of our invention will be described with reference to FIGS. 2 and 7. One signal in data bus 46 is used as the miniature page attribute for input to AND gate 202. Four more bits, it will be recalled, from data bus 46 are sampled in bus 204 as inputs to a 4 to 1 multiplexer 208. Two of the line counts in bus 74, Line Count 2 and Line Count 4, are select inputs to the 16 to 4 multiplexer 210. These line counts are also select inputs to the 4 to 1 multiplexer 208. The output of AND gate 202 is used to set RS latch 222 and is an enable input to the 4 to 1 multiplexer. The output of the 4 to 1 multiplexer is the set input to RS latch 224. Once set, these RS latches 222 and 226 remain set until the horizontal reset signal on line 66 (from FIG. 1) is active. When RS latch 222 is set, its output, the miniature page latch signal, is used to inhibit the normal character attributes associated with the data bits in bus 46. The miniature page latch signal is used with the Data Clock signal on line 26 to set the D-latch 230. The output of D-latch 230, called miniature page mode signal, is used to disable all the normal character attributes and the character generator storage 76 (in FIG. 1). Miniature page mode is also input to block 240 where it is used to enable the outputs 250, 252, 254, 256, 258, 260, 262, and 264, which in turn are input to miniature page data bus 90.

Data bus 46 is input to the 16 to 4 multiplexer 210. The output of RS latch 224 is applied to line 228 and is input to EXCLUSIVE-OR block 218 with Line Count 1. The output of EXCLUSIVE-OR block 218 on line 219 is Line Count 1 when RS latch 224 is not set and is (NOT) Line Count 1 when RS latch 224 is set. The signal on line 219 is input to the 16–4 multiplexer as the Output Enable signal. The four outputs of the 16–4 multiplexer drive lines 242, 244, 246, and 248, respectively. Each is fanned out to form two data inputs to output driver block 240.

Thus, it can be seen that having the proper bit or bits in bus 204 active and selected into the 4 to 1 multiplexer at the same time that the miniature page attribute on line 200 is gated through AND gate 202 causes RS latch 224 to be set. The output of latch 224 on line 228 will be input to EXCLUSIVE-OR gate 218. This causes the inverted signal from line 216 to be input to the 16 to 4 multiplexer 210. This in turn results in outputs on lines 242, 244, 246, and 248 being enabled during the upper half of the 2×4 miniature page character box rather than the normal lower half. By using this scheme, 1½ line spacing can be shown in a miniature page representation as follows. It will be recalled that each of the four lines, 182, 184, 186, and 188, in a 4×16 box such as 181 in FIG. 6 is a separate miniature page line.

1. First normal size character line (16 bits/character) contains:
   a. first miniature line - normal orientation (2×4 character box)
   b. second miniature line - all spaces c. third miniature line - flipped orientation (2×4 character box) (RS latch 232 set)
d. fourth miniature line - normal orientation
2. Second normal sized character line contains:
 a. fifth miniature line - all spaces
 b. sixth miniature line - flipped orientation
 c. seventh miniature line - normal orientation
 d. eighth miniature line - all spaces
3. Third normal sized character line contains:
 a. ninth miniature line - flipped orientation
 b. tenth miniature line - normal orientation
 c. eleventh miniature line - all spaces
 d. twelfth miniature line - flipped orientation
4. Etc.

In this example, the interline spacing between lines of miniature page characters has been increased so that effectively the miniature page character box is now 2×6 (1½ line spacing), instead of the normal 2×4. It can be seen in this example that by using the proper combinations of normal, all spaces, and flipped miniature page lines any multiple of half line spacing above single line spacing can be displayed, i.e., 1, 1½, 2, 2½, 3, 3½, etc.

Figure 7A:
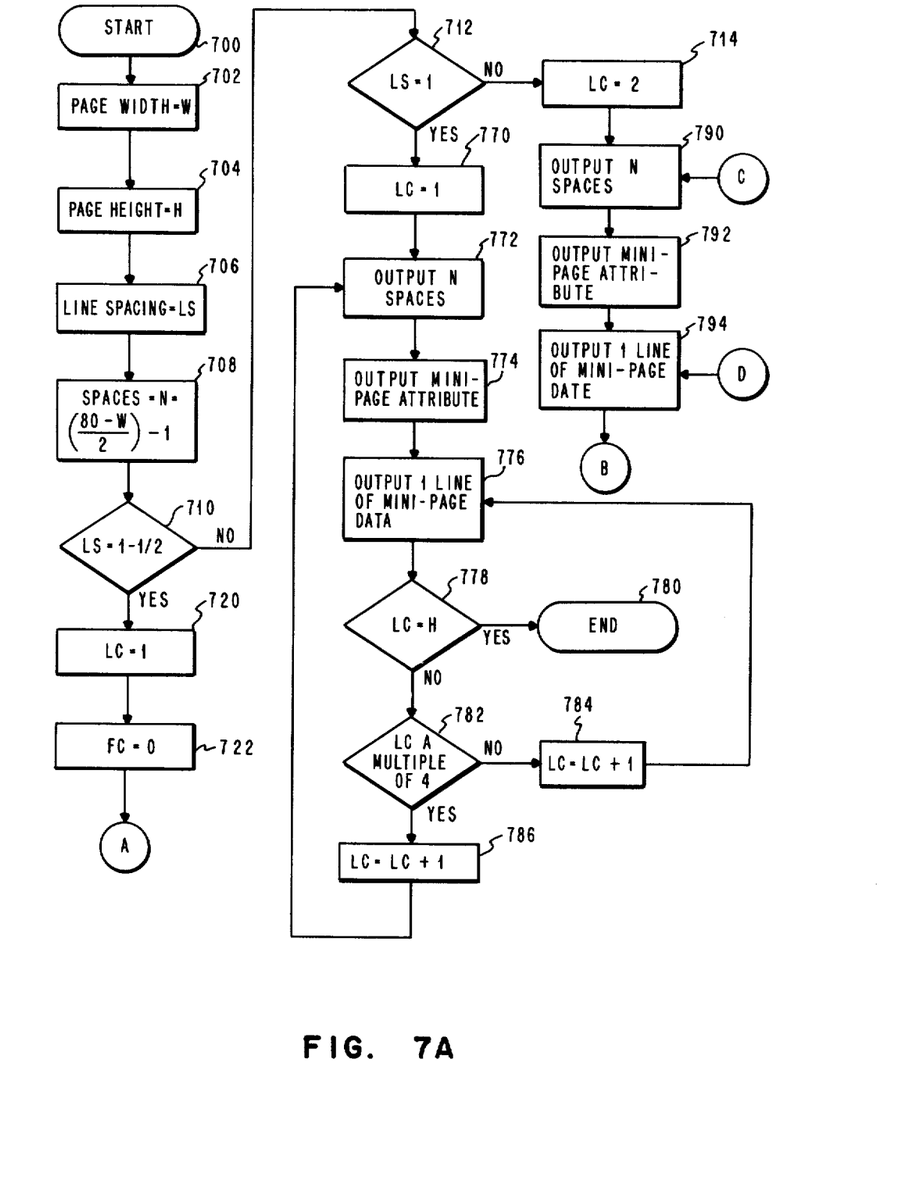
Figures 7B, 7C:
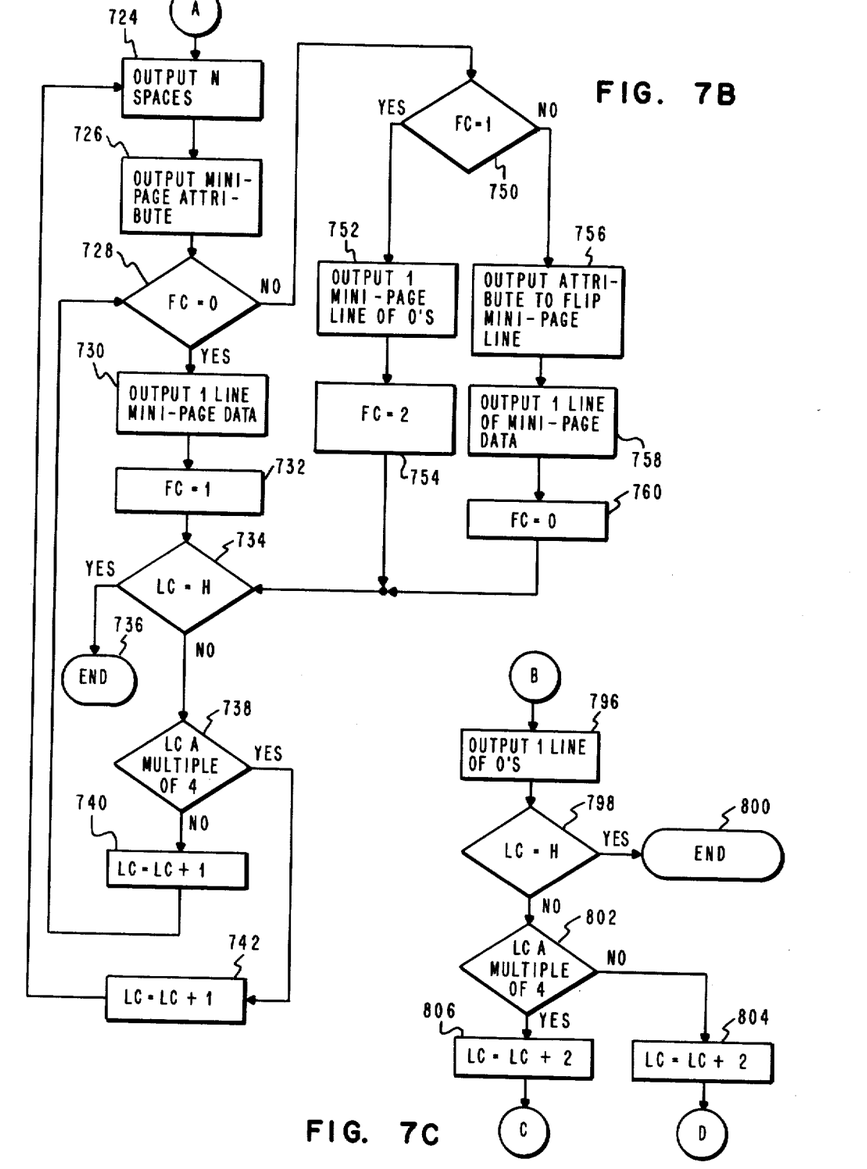

The process of loading miniature page data from the system main memory 8 into the refresh memory 18 in FIG. 1 may be appreciated having reference to the flow chart of FIG. 7. It will be recalled that it is well known and conventional to present a menu frame on the CRT to the user of word processing systems. Using a light pen, keystroke or the like, the user/operator of the system indicates certain parameters for that particular job. Referring now to FIG. 7, the process starts at block 700. The page width W is retrieved from the user designation on the menu frame at block 702. Likewise, block 704 indicates obtaining the user chosen page height H. Line spacing LS also from the menu is obtained in the step represented at block 706.

The overall objective of the invention is to provide the user of a keyboard display word processing system with a means for appreciating the ultimate hard copy format to be developed. This includes generating on the screen a proportional outline of the page size chosen and displaying character representations to indicate the relative spatial relationship including interlinear spacing. The first calculation in this process performed by processor 6 of FIG. 1 is to determine the number of spaces which will remain to the left of the miniature page outline when displayed. Block 708 represents this calculation and is equal to 80, the number of horizontal spaces in the particular screen minus W the width of the user chosen output divided by 2 take away 1. Clearly, screens having other widths would require the use of numbers other than 80.

Decision block 710 represents the processor determination whether the user chosen interlinear spacing is 1½. If it is not 1½ spacing, LS is checked against single spacing at decision block 712. If it is not single spacing, it is assumed to be double spacing at process block 714. At this point, it should be recognized that other multiples of these spacings will be handled in the same way as will be described. For the sake of concise explanation, however, the flow chart represents the process required for single, 1½, and double spacing only.

If the line spacing chosen by the user is 1½ spacing, then output line count LC is initialized to one at block 720 and flip count FC, a variable for use in formatting properly interlinearly spaced text representations, is initialized to zero at block 722. The processor at block 724 outputs N spaces to display refresh memory 18 of FIG. 1 in block 724. Processor output of the miniature page attribute to the refresh memory is indicated at block 726.

If flip count FC is zero, as determined in decision block 728, then the processor outputs one line of miniature page data to refresh memory 18 at block 730 and then sets flip count equal to one at block 732. At decision block 734 the processor determines whether the miniature page line count is equal to the user chosen page height. If it is, processing terminates at end point 736.

If it is not, the processor determines whether line count has reached a number which is an integral multiple of 4 at decision block 758. If LC is not an integral multiple of 4, then at block 740 it is incremented by one and control returns to decision block 728. If line count is an integral multiple of 4, then at block 742 it is incremented by one and control is returned to block 724 where N spaces will be output to refresh memory 18.

It will be recalled at this point that, because four character representations from four miniature page lines are output in the space required by one full size character, N full size character blanks do not need to be output until four whole lines of miniature page data have been output.

If at decision block 728 flip count FC is determined to be not equal to zero, it is checked at 750 to see if it equals 1. If FC is equal to one, at block 752 a miniature page line of zeros is output to refresh memory 18 and flip count is set equal to 2 at block 754. Control is passed back to decision block 734. If, however, at decision block 750 flip count was found to be not equal to 1, then at block 756 the processor outputs the attribute information previously described with reference to FIG. 6 to flip the miniature page line. That is, to indicate the absence or presence of data in the uppermost half of the 2×4 character box with the bottom half of each 2×4 character box in that particular miniature page line all blanks. Then at block 758, the processor outputs a regular, non-flipped line of miniature page data sets FC equal to zero at block 760 and returns to block 731.

Returning to decision block 712, if the user has chosen line spacing LS to be 1, then at process block 770 line count LC is set equal to 1. At block 772 the processor output of N spaces to refresh memory 18 is indicated. The next step is to output a miniature page attribute at block 774. At block 776 the processor causes one regular line of miniature page data to be output to the refresh memory 18 and then at decision block 778 determines whether line count has reached the user chosen page height H. If it has, processing terminates at termination point 780. If line count is not equal to the user chosen page height H, then the processor checks at decision block 782 to determine if line count is an integral multiple of 4. If not, line count is incremented by 1 at block 784 and control returns to block 776 and another line is output to the refresh memory 18. If, however, line count is an integral multiple of 4 then, as previously described with 1½ spacing, line count is incremented by one at block 786 and control passes to block 772 to place N full size spaces in refresh memory 18 to the left of a miniature page outline.

For double spacing, that is with one line of blanks between each line of data representations, process block 714 represents the setting of line count equal to 2. At block 790 is represented the process of outputting N regular size spaces to refresh memory 18.

The miniature page attribute is output at block 792. The processor outputs one line of miniature page data as represented by block 794. A blank line on the display is caused by processor 6 outputting a complete line of zeros to the screen refresh memory 18 at block 796. Decision block 798 represents a determination of line counts reaching the user chosen page height. If it has, processing terminates at 800. If it has not, at block 802 the decision is made whether line count is an integral multiple of 4. If it is not, then line count is incremented by 2 at block 804 and control returns to block 794 to output another line of miniature page data. If line count is a multiple of 4, then it is incremented by 2 at 806 and control returns to block 790 to output N spaces to the refresh memory 18.

In summary, there has been provided in a word processing system having a relatively small display the ability to display on less than the entire screen surface a miniature representation of a full page of text being developed in memory for subsequent hard copy output. The additional feature of multiple half-line spacing within the miniature page representation is also provided to provide the operator with a true representation of the printed page on output. While a particular embodiment has been shown and described it will be obvious that other character box sizes may be used with appropriate modifications, as well as making certain modifications to accommodate particular display device requirements. Further, it is obvious that certain modifications may be made if a scanning technique other than horizontal interlaced scanning is employed.

While we have shown and described a particular embodiment of our invention whereby it should be clear to those skilled in the art that the above-mentioned and other changes in form and detail may be made without departing from the spirit and scope of the invention.

What is claimed is:

1. In a processor driven word processing system including interface logic connecting a display, a display memory and a main memory, the improvement in said interface logic comprising:
   means for providing for display on the display a video output data stream representative of an entire page of printed text to be produced by the system, said data stream comprising identical miniature character symbol constructs, said identical miniature character symbol constructs comprising a matrix having upper and lower halves said upper half being blank and said lower half being blank or not blank as a function of the value of a bit stored in the display memory indicative of the presence or absence of a character in said main memory; and
   means responsive to a predetermined attribute bit in said display memory for displaying said miniature character symbol constructs with their upper and lower halves reversed for representing a half-line space between sequential lines of printed text or not.

2. The system of claim 1 wherein said means for displaying includes means for providing blanks between rows of miniature character symbol constructs to represent integral line spacing between sequential lines of printed text.

3. The system of claim 2 wherein said miniature character symbol constructs are $2 \times 4$ dot matrices.

4. The system of claim 2 further including means for displaying the video data stream comprising miniature character symbol constructs so that at least one row of blanks is adjacent one row of reversed miniature character symbol constructs to represent odd multiples of half line spacing.

5. The system of any of claims 1, 2, 3, or 4 further including means for providing a video output data stream for display on less than the entire screen.

* * * * *